United States Patent
Zacks et al.

(10) Patent No.: US 12,149,436 B2
(45) Date of Patent: Nov. 19, 2024

(54) VIRTUAL TESTING OF NETWORK RESILIENCY

(71) Applicant: Cisco Technology, Inc., San Jose, CA (US)

(72) Inventors: David John Zacks, Vancouver (CA); Nagendra Kumar Nainar, Morrisville, NC (US); Madhan Sankaranarayanan, Chinnamanur (IN); Jaganbabu Rajamanickam, Kanata (CA); Craig Thomas Hill, Sterling, VA (US); Cesar Obediente, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/979,640

(22) Filed: Nov. 2, 2022

(65) Prior Publication Data
US 2024/0146643 A1 May 2, 2024

(51) Int. Cl.
*H04L 45/00* (2022.01)
*H04L 43/50* (2022.01)
*H04L 45/28* (2022.01)

(52) U.S. Cl.
CPC .............. *H04L 45/22* (2013.01); *H04L 43/50* (2013.01); *H04L 45/28* (2013.01)

(58) Field of Classification Search
CPC ......... H04L 45/28; H04L 45/70; H04L 45/04; H04L 45/00; H04L 45/22; H04L 45/38; H04L 45/24; H04L 45/123; H04L 45/566; H04L 45/586; H04L 47/12; H04L 12/4641; H04L 12/4633; H04L 41/0663; H04L 2212/00; H04L 45/247
See application file for complete search history.

(56) References Cited

U.S. PATENT DOCUMENTS

| | | | |
|---|---|---|---|
| 10,999,125 B1 | 5/2021 | Srinath et al. | |
| 11,646,935 B1* | 5/2023 | Khalid | H04L 45/586 |
| | | | 709/226 |
| 2010/0302935 A1 | 12/2010 | Zhang et al. | |
| 2016/0127192 A1* | 5/2016 | Bryant | H04L 12/42 |
| | | | 709/224 |
| 2018/0077051 A1* | 3/2018 | Nainar | H04L 45/745 |
| 2018/0375751 A1* | 12/2018 | Lee | H04L 43/0829 |

(Continued)

*Primary Examiner* — Rachel J Hackenberg
(74) *Attorney, Agent, or Firm* — Lee & Hayes, P.C.

(57) ABSTRACT

Technologies for testing resiliency of a data network with real-world accuracy without affecting the flow of production data through the network. A method according to the technologies may include receiving a production data packet and determining a preferred data route toward a destination node for the production data packet based on a first routing information base, wherein the first routing information base includes a database where routes and route metadata are stored according to a routing protocol. The method may also include, receiving a test data packet, and determining an alternate data route toward the destination node for the test data packet based on a second routing information base, wherein the second routing information base simulates an error in the preferred data route. The method may include sending the production data packet to the preferred data route and sending the test data packet to the alternate data route.

17 Claims, 6 Drawing Sheets

(56) References Cited

U.S. PATENT DOCUMENTS

| | | |
|---|---|---|
| 2019/0260672 A1* | 8/2019 | Haas ................... H04L 67/104 |
| 2020/0045087 A1 | 2/2020 | Srinath et al. |
| 2021/0328917 A1* | 10/2021 | Menon ................. H04L 45/566 |
| 2021/0367832 A1 | 11/2021 | Ramachandran et al. |
| 2022/0231904 A1 | 7/2022 | Di Martino |
| 2023/0059537 A1* | 2/2023 | Gavand ............... H04L 67/1006 |

\* cited by examiner

VIRTUAL TESTING OF NETWORK RESILIENCY

TECHNICAL FIELD

The present disclosure relates generally to techniques for, among other things, virtually testing for network resiliency without disrupting operation data traffic.

BACKGROUND

Computer networks such as the internet have become a ubiquitous feature of modern computer environments, with vast amounts of data being continuously transported over such networks. Such networks include a plurality of nodes, which may be in the form of routers or switching devices that route data between an origin node and a destination based on one or more routing protocols. One advantageous feature of feature of such networks is the ability to route data over multiple possible routes across the network, which can make such networks very resilient in the event that one or more links in the network fail. With the importance of such computer networks, testing to ensure viability and robustness of data routing through such computer networks has become increasingly important.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
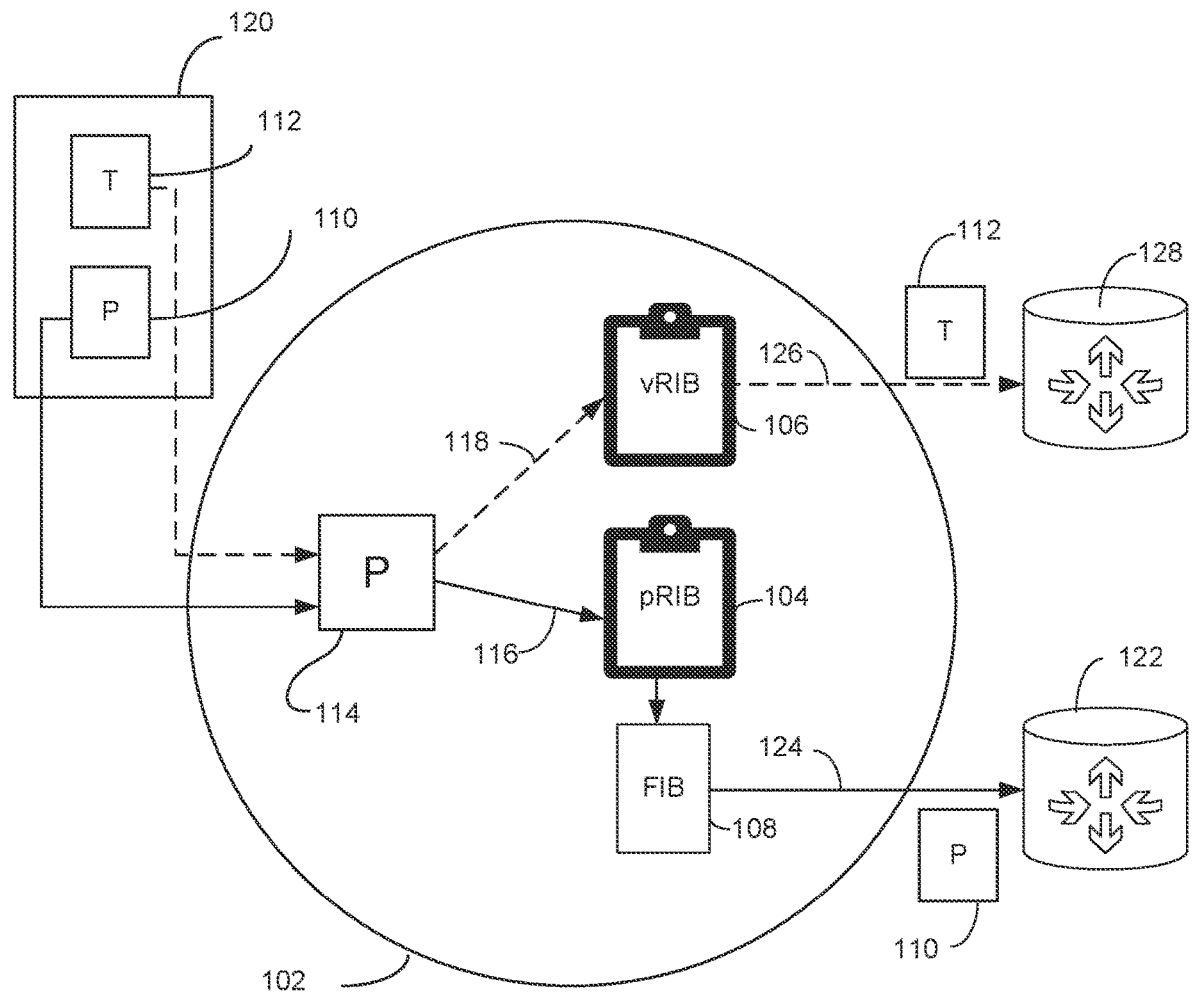
FIG. 1 illustrates a node of a computer network, wherein the node has a production routing information base for routing production data and a virtual routing information base for routing a test data pack to an alternate route to test functionality of the alternate route without disrupting the flow of production data through primary route

In a computer network, such as the internet, computer data can flow from an origin node such as a user to an end destination node through many different possible pathways. Each pathway can include many nodes. When a preferred path fails, such as when a link between nodes has gone down, data can be routed through an alternate path, thereby ensuring that data continues to flow between the origin and the destination. In order to ensure resiliency of the data network it is desirable to ensure not only that the preferred path functions properly, but also that an alternate path or paths function properly. This disclosure describes various technologies for testing resiliency of a data network with real-world accuracy without affecting the flow of production data through the network. By way of example, and not limitation, a method according to the technologies described herein may include receiving a production data packet and determining a preferred data route toward a destination node for the production data packet based on a first routing information base, wherein the first routing information base includes a database where routes and route metadata are stored according to a routing protocol. The method may also include, receiving a test data packet, and determining an alternate data route toward the destination node for the test data packet based on a second routing information base, wherein the second routing information base simulates an error in the preferred data route. The method may include sending the production data packet to the preferred data route and sending the test data packet to the alternate data route. In one embodiment, the method can further include determining whether the test data packet reached the destination node.

In one embodiment, the method can include determining whether the test data packet reconverged at the destination node. In one embodiment, the first routing information base (which can be a primary routing information base) can determine which route of the network is the most efficient, fastest route between the origin node to the destination node and can load this information into a forwarding information base (FIB). The second routing information base (which can be referred to as a virtual routing information base) can determine an alternate route, which in some embodiments can be a next, next most efficient or fast route between the origin node to the destination node. The second routing information base does not load routing information to the FIB and therefore, does not affect production traffic routing. In one embodiment, the first and second routing information bases store routing information in software, which may include a database, and the FIB stores the routing information in computer hardware or software for fast access and routing of production data.

In one embodiment, the test data packet can be an encapsulated test frame including a wrapper that is encoded to indicate routing by the second (virtual) routing information base. In one embodiment, a method can include determining whether the test data packet has successfully reconverged at the destination node.

Additionally, the techniques described herein may be performed as a method and/or by a system having non-transitory computer-readable media storing computer-executable instructions that, when executed by one or more processors, performs the techniques described above.

Example Embodiments

This disclosure describes a device and method for accurate non-disruptive testing of a data network. The disclosed device and method allow a computer network to be tested by simulating an error on a preferred data pathway across the network and rerouting a test data packet through an alternate data path while continuing to send and receive production data through the preferred data pathway without disruption.

In a computer network such as the Internet, data can travel from one location such as a user device (e.g. computer, server, cell phone, tablet, etc.) to destination device such as a computer server, cloud service or other device over a route that includes a plurality of nodes. The nodes can be devices such as routers and/or switches. The data packet can travel through one of many possible data routes over many different available paths.

In many environments, each node (e.g. router or switching device) can include a routing information base (RIB) and may also include a forwarding information base (FIB). The RIB can include software and circuitry that can perform calculations to determine which of the many available paths from an origin to a destination is the most preferred, path. This determination can include a calculation and determination of which route is most efficient and provides the fastest transfer of data. In some cases, once the RIB has determined which route is the preferred route, this routing information can be sent to the node's FIB, where it is stored for fast access when routing data. In some embodiments, the FIB can store the routing information in hardware, although in other embodiments the FIB may store the routing information in software.

As mentioned above, routing and routing functions in networks, such as enterprise and carrier networks can be performed by network devices such as routers and switches. Routers can run routing protocols and the routing protocols (along with static configuration information) populate the Routing Information Base (RIB) of the router. The RIB is managed by the RIB manager and the RIB manager provides an interface to its clients, such as by using routing protocols, to insert routes into the RIB. The RIB manager consults the RIB and decides how to program the Forwarding Information Base (FIB) by interfacing with the FIB manager.

Routing protocols are inherently distributed in a network and each router can make an independent decision based on the routing data received from other nodes. Network-device protocol-based RIB population suffices for most cases where distributed network control can be used. However, there are situations wherein the network operators can route data by configuring static routes, policies, and RIB import/export rules on the routers. There are also cases in which a network operator might want to program the RIB based on data unrelated to just routing. Programming of the RIB could be based on other information such as routing data in the adjacent domain or the load on storage and compute in the given domain. Or, it could simply be a programmatic way of creating on-demand dynamic overlays (E.G. GRE tunnels) between compute hosts (without requiring the hosts to run traditional routing protocols).

A RIB is an entity that contains routes. It is identified by its name and is contained within a routing instance. A network device may contain routing instances and each routing instance may contain RIBs. The name should be unique within a routing instance. All routes in a given RIB are of the same address family, and each RIB belongs to a routing instance.

A routing instance, in the context of the RIB information model, is a collection of RIBs, interfaces and routing parameters. The set of interfaces indicates which interfaces are associated with a particular routing instance. The RIBs specify how incoming traffic is to be forwarded, and the routing parameters control the information in the RIBs.

Using route preference, a client can pre-install alternate paths in the network. Routers can connect networks using an Open Shortest Path First (OSPF) Internet Protocol (IP) or some other IP. Other examples of Internet Protocols include BGP, EIGRP, RIP, or IS-IS among others. For example, if OSPF has a route preference of 10, then another client can install a route with a route preference of 20 to the same destination node. The OSPF route will get precedence and will get installed into the forwarding information base (FIB). When the OSPF route is withdrawn, such as from a downed link in the route, the alternate path will get installed into the FIB.

A great advantage of such a computer network is its ability to provide resiliency. If one of the routes, such as the preferred route, fails such as due to a failed link between two or more nodes, the data can be relatively quickly re-routed to the next most preferred route. In order to ensure optimal resiliency of the network it is desirable to periodically test the alternate routes to ensure that in the event of a failure of the preferred route the data will still reach the intended destination via one or more alternate routes.

One way to test these alternate routes can include injecting deliberate failures of different types into the end-to-end network system, or a part of it (which can include the preferred network route), and observing whether the results match predictions, in order to fine-tune disaster planning and recovery processes. However, difficulties are encountered when deploying such resiliency testing. For instance, employing such testing on the preferred or production network risks disruption to actual production data traffic flow. The time it takes to re-route the traffic can slow production data traffic while the data is being re-routed and may even cause the data to fail to re-converge at the destination as desired. Therefore, while injecting deliberate failures into the network can enable network administrators to learn when the data will reconverge as desired at the intended destination, performing such testing may cause delays and/or reconvergence failures for data flowing through the network.

Another way to test alternate data routes can be to deploy the resiliency test in an offline replica of the routing environment. However, such testing may not fully replicate the production system and may, therefore, yield inaccurate results. That is, while performing the testing in an offline environment solves the problem of disrupted flow of the actual production data, it is possible that the offline environment will not fully replicate the true network environment and, thus, the quality of the testing itself may suffer. Therefore, neither of these testing protocols is ideal.

As described above, a novel testing method and system allows accurate real-world testing of a network while leaving actual production data traffic unaffected and undisturbed. In order to implement such testing, each node can be provided with a first routing information base, which can be referred to as a production routing information base (pRIB) and also a second routing information base which can be referred to as a virtual routing information base (vRIB). The pRIB can function as an ordinary routing information base by determining a preferred data route and storing the results in the forwarding information base (FIB) to route production data from the origin to the destination over the preferred, most efficient route. The vRIB, on the other hand, can simulate a failure in the preferred route and re-route a test data packet along a next most preferred (alternate) route to test for resiliency of the alternate route, while leaving production data (routed by the pRIB) completely unaffected. In some instances, the pRIB is enabled to load routing information to the FIB while the vRIB does not communicate with the FIB, and therefore, does not affect the delivery of production data.

In addition to testing the next most preferred or alternate route, this system can be used to test the next, next most preferred route and so on by simulating an error in the preferred route as well as the next most preferred route. This process can continue to test many different possible data routes to ensure resilience of the network. After re-routing the test data packet, further testing can be performed to ensure reconvergence of the test packet at the destination node.

Therefore, when a production data packet is introduced in the network, the nodes send the data packet along the primary route as determined by FIB. Meanwhile, when a test data packet is introduced into the network, the virtual routing information base vRIB of the nodes determines that the data packet is a test data packet based on the special encapsulation of the test data packet indicating that the data packet is a test packet and, therefore, sends the test data packet along the alternate route as if the primary route was unavailable. The techniques may then determine whether the test data packet reaches the intended destination via the alternate route (that is, when the test data packet reconverges) without disrupting the flow of the actual production data packets in the system.

According to the techniques described herein, several improvements in computer-related technology can be realized. For instance, the techniques described herein allow real-world testing of a computer network to ensure that, in the case of a failure of a preferred or primary data route, production data can be accurately and reliably re-routed to another, alternate route without any loss of data. In addition, such testing can be performed concurrently with the routing of actual production data without risking any loss of production data and without any reduction in the speed with which production data is routed through the primary production data route.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a node 102 of a computer network, which will be described further herein below. The node 102 includes a routing information base, which can be a production Routing Information Base (pRIB) 104, and a second routing information base which can be a virtual Routing Information Base (vRIB) 106. The node 102 may also include a Forwarding Information Base (FIB) 108. The node 102 can be a router or switching device that can be used in a computer network to route data traffic.

The node 102 can receive data packets, which can include a production data packet 110, and a test data packet 112. In one embodiment, the production data packet 110 and the test data packet 112 can be processed by a processor 114, which can include software and/or circuitry that can be configured to identify whether the data packet is a production data packet 110 or a test data packet 112. The production data packet 110 can be sent to the production routing information base (pRIB) for routing processing as indicated by solid line 116. The test data packet 112 can be routed to the second or virtual routing information base (vRIB) 106 as indicated by dashed line 118.

In one embodiment, the production and test data packets can be received from a device 120. In one embodiment, the device 120 can be another node of a network, which will be described in greater detail herein below. In another embodiment, the device 120 can be an origin node of the network. In another embodiment, the device 120 can be a user device, such as a computer, server, etc.

In one embodiment, the pRIB performs routing calculations to determine a best, most efficient route from the node 102 to a destination node which can be through one or more intermediate nodes 122, which may be a router or other device. This best, most efficient route can be referred to as a production route as indicated by solid line 124. In one embodiment, the pRIB can load data regarding the production route 124 into the Forwarding Information Base (FIB) 108. The FIB can store this production route data in hardware or software which can be quickly and easily accessed for routing data packets efficiently. Production data packets 110 can be routed between the node 102 and the node 122 over the production data route 124 by accessing the routing information stored in the FIB 108.

With continued reference to FIG. 1, the vRIB 106 receives the test data packet 112. The vRIB simulates an error in the production data route 124 and determines an alternate data route 126, just as if the production data route 124 has failed in some way, such as by a downed link in the production data route 124. The vRIB routes the test data packet 112 along the alternate data route 126 to a node 128 or multiple nodes, which may include a destination node and intermediate nodes. It should be noted that, while the pRIB enters production routing information into the FIB 108, the vRIB does not enter any information into the FIB 108. Therefore, routing of production data is not affected by the re-routing of the test data packet 112.

In some embodiments, one or more of various possible routing protocols that can be used to route data can be virtualized. Such routing protocols can operate in Virtual Routing and Forwarding (VRF) instances. Such routing protocols can communicate mapping of routes into VRFs. There are various ways in which test data 112 from the vRIB 106 can be mapped to a test route. In one embodiment, the test data 112 can be designated as test data (as opposed to production data) to be routed by the vRIB 106, and in some embodiments this designation can be made "out-of-band" such a by a network controller or by manual configuration.

Figure 2:
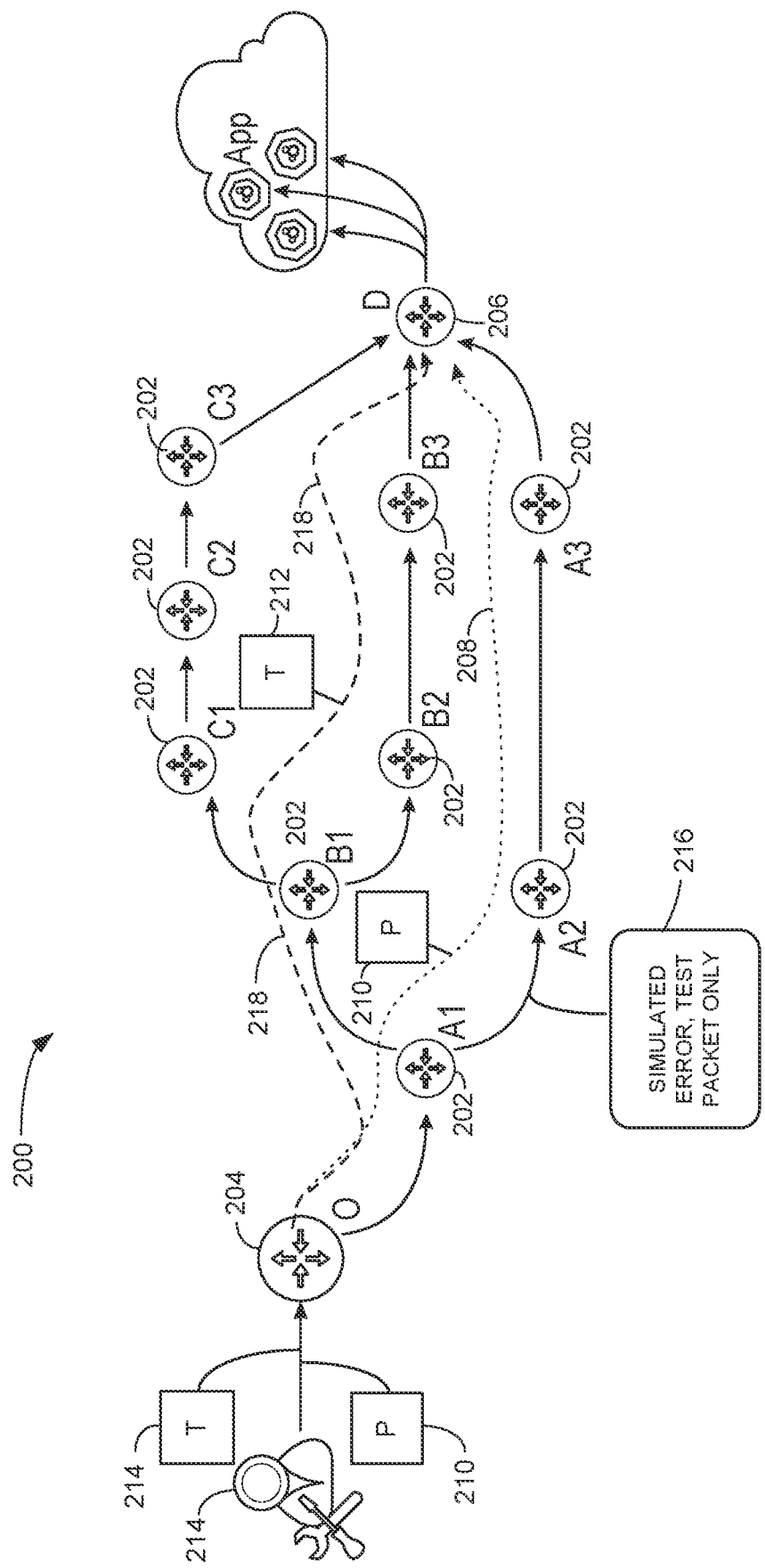
FIG. 2 illustrates a computer network having nodes that each include a production routing information base and a virtual routing information base, and wherein production data is routed through a primary route and a test packet is routed through an alternate route without disrupting the flow of production data through the primary data route.

FIG. 2 illustrates a computer network 200, implementing a non-disruptive testing method. The network 200 can include a plurality of nodes 202, which may include an origin node 204 and a destination node 206. At least one of the nodes 202, 204, 206 includes a production routing information base pRIB 104 and at least one virtual routing information base vRIB 106 as previously described above with reference to FIG. 1. The pRIBs 104 and vRIBs 106 are not shown in FIG. 2 so that an example of a network configuration can be more clearly described. However, it should be understood that the pRIB 104 and pRIB 106 of each node 202, 204, 206 can function as described above with reference to FIG. 1. In addition, one or more or each of the nodes 202, 204, 206 can include a Forwarding Information Base (FIB) 108 as previously described with reference to FIG. 1.

With continued reference to FIG. 2, the nodes 202, 204, 206 can route production data packets 210 through a production data route indicated by dotted line 208 based on one or more routing protocols using the pRIB 104 (FIG. 1) as described above. In addition, routing information from the pRIB 104 (FIG. 1) can be loaded to the forwarding information base (FIB) 108 (FIG. 1), as previously discussed, for quick access and efficient data transmission across the production data route 208. In one embodiment, the FIB 108 can store the routing information in computer hardware circuitry or software for fast access, providing fast routing of data across the production data route 208.

The nodes 202, 404, 206 can also receive a test data packet 212, such as from a user device 214. The test data packet 212 can be a specially encapsulated test frame which can include a wrapper such as a Virtually eXtensible Local Network (VXLAN), which encodes an indicator of which vRIB 106 (FIG. 1) to route the packet in the context of, along with an encapsulated test frame (which can be any test traffic ping, traceroute, ThousandEyes, etc.). There can be one or more vRIBs 106 in a single node 202, 204, 206. The vRIB 106, simulates an issue 216 with production data route 208, such as a down or damaged link in the production data route, and reroutes the test data packet 212 through an alternate data route indicated by dashed line 218, just as would be the case if an actual failure occurred in the production data route. This can be accomplished by hop-to-hop traffic relay within the context of a given vRIB 106 for the specifically encapsulated test frames.

In one embodiment, these encapsulate test traffic flows could also be digitally signed to enhance the security and/or verifiability of test traffic. This, however, would require additional processing for such digitally signed encapsulated test traffic within the transit nodes involved. Such an option could encompass digitally signing the encapsulated test traffic at the origin, 204 and then checking this digital signature on the transit traffic at each hop prior to forwarding such digitally signed, encapsulated test traffic over the vRIB involved. This may be desirable in high-security environments in which it is prioritized that only designated, highly secure test traffic flows may transit the vRIB test topology (e.g. alternate route 218) and related nodes 202.

In one embodiment, the test data packet 212 (rather than being an encapsulated test data packet as described above) can be identified by flagging, in order to identify and route the test data packet 212 over the alternate data route 218. In one embodiment, such flagging could include (for example) using un-encapsulated traffic tracing flows, but with specific Internet Protocol version 4 (IPv4) or Internet Protocol version 6 (IPv6) header markings that would allow transit nodes within the network to recognize such markings as indicating that the traffic should be directed across the designated alternate route 218 (vRIB network path). Various options could be available for such tracing traffic flagging. For example, in one embodiment, the use of the Most Significant Bit (MSB) within the Fragmentation field within an IPv4 header could be used to flag data packet 212. The MSB can be the bit furthest to the left or highest digit. The MSB (per Request For Comment (RFC)), is reserved but could possibly be repurposed for this use within a private or virtually private enterprise-controlled domain, so long as this bit is cleared prior to wider distribution to outside networks. As a single-bit flag, this would only be able to support one alternative vRIB topology (e.g. alternate route 218).

In another embodiment, the use of odd values within the Differentiated Service Code Point (DSCP) field in the Type of Service (TOS) byte can be used to define the vRIB path or paths. This can work because all RFC fields are even. This has the benefit that multiple different odd values could be used to designate which of potentially multiple vRIB topologies the test packet 212 in question should be directed over. In yet another embodiment, the use of flow labels within an IPv6 packet header can be used to designate which of the potentially multiple vRIB topologies the packet in question should be directed over.

One possible downside to using such flagging-based approaches can be that all of the possible flagging fields available for use are either fungible (alterable) on transit nodes, such that the end-to-end nature of the flag involved for vRIB selection could be lost, or alternatively that the behavior of the node (for example, queueing based on altered DSCP values) may be different than the standard traffic flows within a node. While all of these issues could be addressed by appropriate coding, in some instances the above-described encapsulation approach may be preferable to address all of these issues without introducing some of the challenges related to a pure flagging-based routing approach. Nevertheless, both options (flagging or encapsulation) provide possible mechanisms for routing a data test packet 212.

While this data packet is 212 is routed through the alternate data route 218, the production traffic continues to travel unaffected through the production data route 208. Whereas the production routing information base pRIB 104 (FIG. 1) can load routing information into the forwarding information base (FIB) 108 (FIG. 1), the virtual routing information base vRIB 106 (FIG. 1) never loads routing information or any other information into the FIB, thereby allowing routing of production data to be unaffected by the test packet re-routing. In one embodiment, the vRIB 106 can calculate the alternate data route 218 to be the next most efficient data route as compared with the production data route 208, just as would be the case in an actual failure of a production data route 208 (preferred, most efficient route). In one embodiment, this calculation can be repeated to test more data routes by calculating a next preferred data route, next-next most preferred data route, next-next-next most preferred data route, etc. in order to test multiple data routes in the network, all while leaving the routing of production data unaffected by the testing.

With the test data packet being re-routed through the alternate data route 218 (or multiple alternate data routes), a determination can be made as to whether, (1) the test data packet 212 actually reaches the destination node 206 and (2) whether the test data packet 212 reconverges properly at the destination node 206.

While the above descriptions have described embodiments wherein the test packet 212 is sent along the alternate route 218 in order to simulate an error, this is by way of example. In other embodiments, the vRIB 106 can send data along the alternate route 218 for other reasons as well. For example, the vRIB 106 can send a data packet 212 along the alternate path 218 in order to test a redundant data path prior to using it or before placing it into production. In addition, various other situations and scenarios can find great advantage in the use of vRIB to send the test data packet 212 along the alternate path 218.

Figure 3:
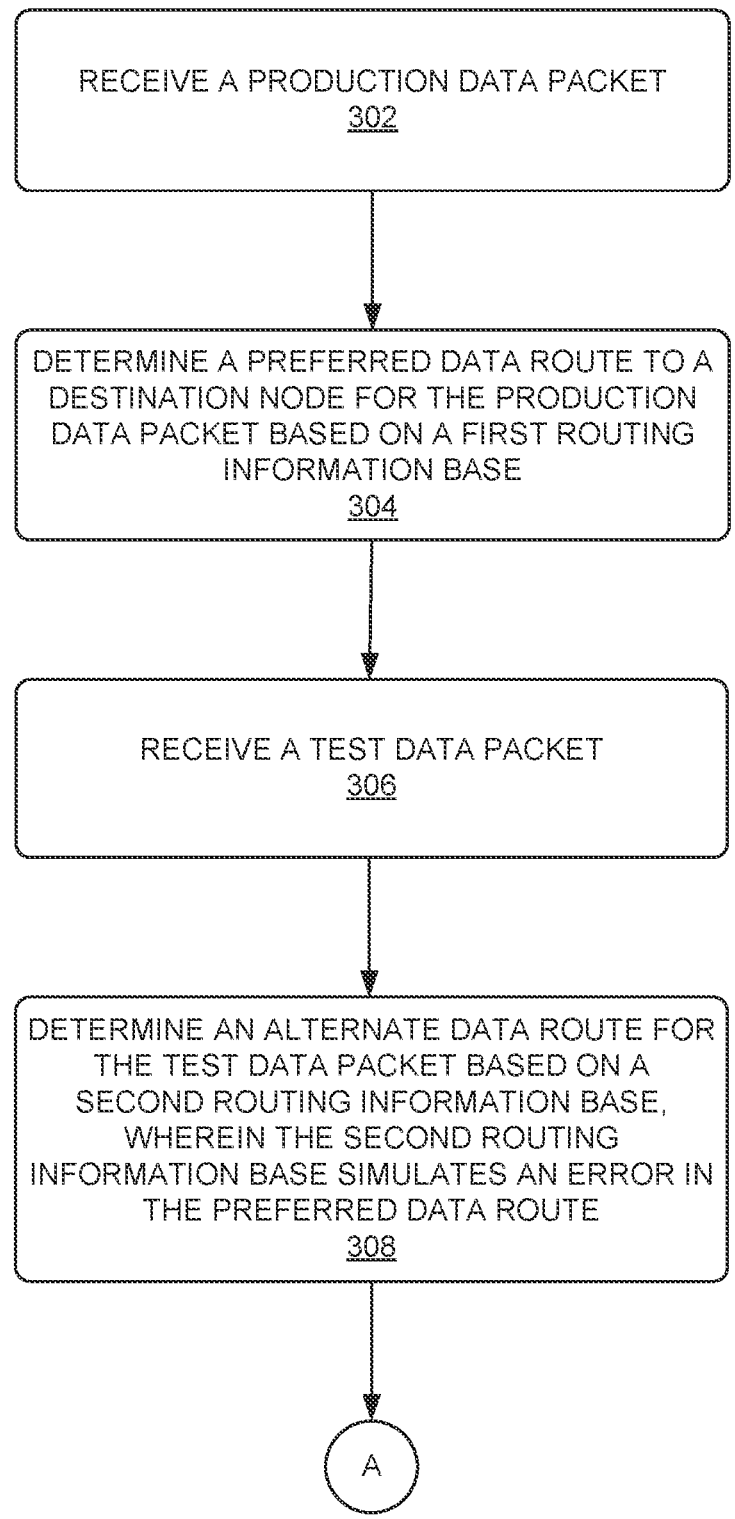
FIGS. 3 and 4 are flowcharts illustrating a method for non-disruptive testing of a data network.
Figure 4:
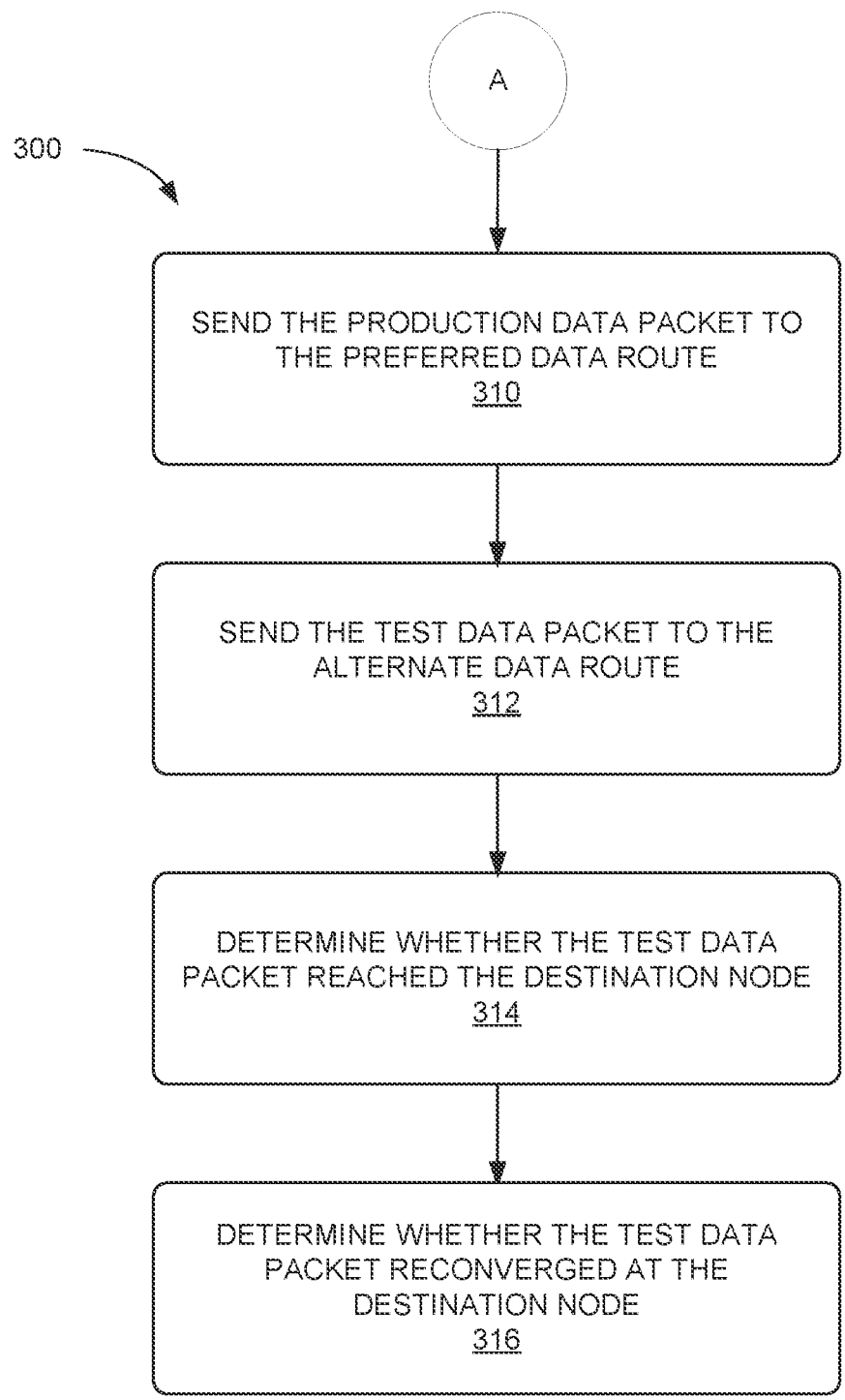

FIGS. 3-4 show a flow diagram illustrating an example method associated with the techniques described herein. The logical operations described herein with respect to FIGS. 3-4 may be implemented (1) as a sequence of computer-implemented acts or program modules running on a computing system and/or (2) as interconnected machine logic circuits or circuit modules within the computing system.

In a method 300, a production data packet is received at 302. The production data packet can be received by a node of a computer network. The node can be a router or switching device of the network. A determination is made of a preferred data route to a destination node for the production data packet based on a first Routing Information Base 304. The first routing information base can be a production routing information base and can be functional to determine the production data route as a fastest, most efficient data route to the destination node based on one or more routing protocols. In one embodiment, data regarding the preferred data route can be stored in a Forwarding Information Base (FIB). In one embodiment, the FIB can store the information regarding the preferred route in computer hardware from which it can be very quickly accessed to route data along the preferred route. In another embodiment, the FIB can store the information regarding the preferred route in software.

A test packet is received at 306. In one embodiment, the test packet can be an encapsulated test frame including a wrapper that is encoded to indicate routing by the second routing information base. A determination is made of an alternate data route toward the destination node for the test data packet based on a second routing information base 308, wherein the second routing information base simulates an error in the preferred data route. In one embodiment, the data regarding the second routing information base is not installed into the forwarding information base. In one embodiment, the method can be performed at a node of a computer network that includes a plurality of nodes each having a first routing information base that routes production data through the preferred data route and a second routing information base that routes a test data packet through the alternate data route. In one embodiment the preferred data route is a most efficient data route of a plurality of possible data routes and the alternate data route is a next most efficient data route of the plurality of possible data routes as determined by the second routing information base.

FIG. 4 continues the illustration of the method 300 and shows that the production data packet is sent to the preferred data route at 310. The test data packet is sent to the alternate data route at 312. A determination is made as to whether the test data packet reached the destination node at 314. In one embodiment, a determination can be made as to whether the test data packet reconverged at the destination node 316.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3-4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5:
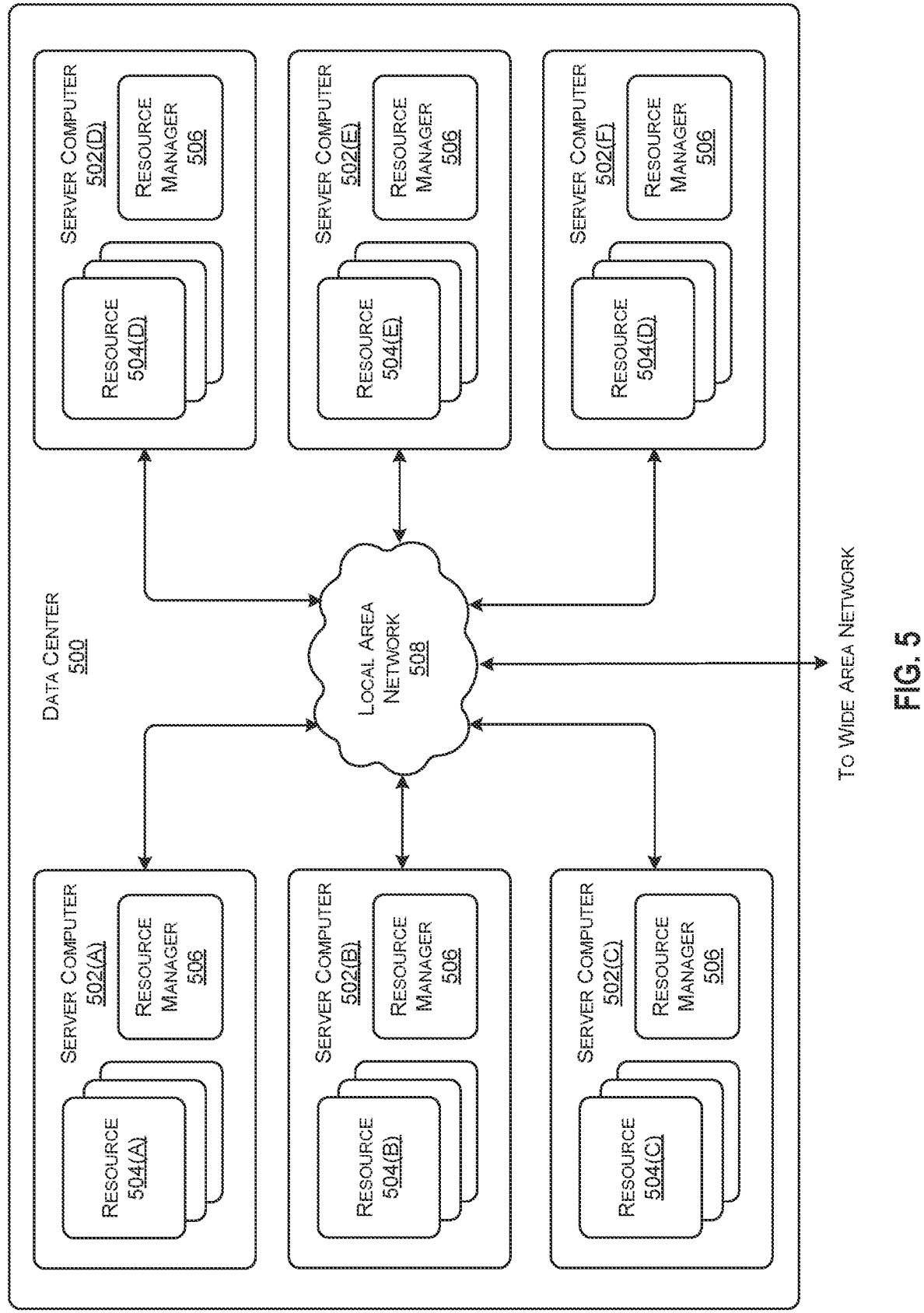
FIG. 5 is a computing system diagram illustrating an example configuration of a data center that can be utilized to implement aspects of the technologies disclosed herein.

FIG. 5 is a computing system diagram illustrating an example configuration of a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, any type of networked devices or nodes described herein.

Although described as servers, the server computers 502 may comprise any type of networked device, such as servers, switches, routers, hubs, bridges, gateways, modems, repeaters, access points, etc.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, security, packet inspection, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate local area network (LAN) 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more application containers and/or virtual machines to perform techniques described herein. In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like. The computing resources 504 may be utilized to run instances of secure access nodes or other workloads.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, secure access points, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
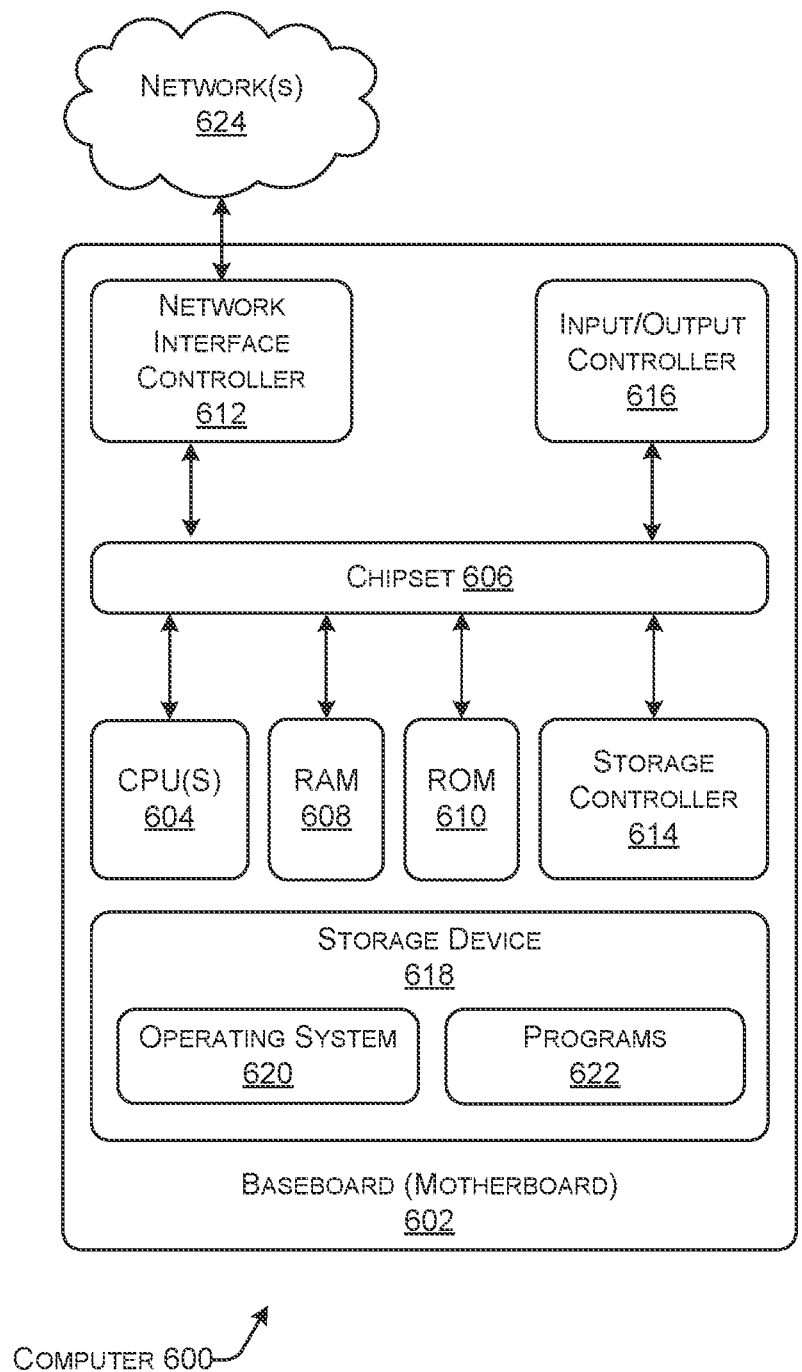
FIG. 6 is a computer architecture diagram showing an illustrative computer hardware architecture that can be utilized to implement aspects of the various technologies presented herein

FIG. 6 is a computer architecture diagram showing an illustrative computer hardware architecture that can be utilized to implement aspects of the various technologies presented herein. The computer architecture shown in FIG. 6 illustrates a conventional server computer, network node, router, workstation, desktop computer, laptop, tablet, network appliance, e-reader, smartphone, load balancer, edge device, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network(s) 624 (e.g., the internet), the cloud-computing network, enterprise network, constituent networks, or the like, and which can include the network 200 described above with reference to FIG. 2. The chipset 606 can include functionality for providing network connectivity through a NIC 612, such as a gigabit Ethernet adapter. The NIC 612 is capable of connecting the computer 600 to other computing devices over the network 624. It should be appreciated that multiple NICs 612 can be present in the computer 600, connecting the computer to other types of networks and remote computer systems. In some examples, the NIC 612 may be configured to perform at least some of the techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 6614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the architectures and or any components included therein, may be supported by one or more devices similar to computer 600. Stated otherwise, some or all of the operations performed by the architectures, and or any components included therein, may be performed by one or more computer devices 600 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes and functionality described above with regard to FIGS. 1-5, and herein. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

The computer 600 may include one or more hardware processors (processors) configured to execute one or more stored instructions. The processor(s) may comprise one or more cores. Further, the computer 600 may include one or more network interfaces configured to provide communications between the computer 600 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for operationalizing workloads at edge network nodes, while maintaining centralized intent and policy controls in a cloud-computing network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for testing resiliency of a data network, the method comprising:
    computing, at a network device, a first routing information base (RIB);
    computing, at the network device, a second RIB that is at least partially a replica of the first RIB;
    receiving, at the network device, production data traffic;
    forwarding the production data traffic on a first route toward a destination node based on the first RIB;
    introducing a resiliency test in the second RIB of the network device that results in the first route going down in the second RIB;
    updating the second RIB to result in an updated second RIB by reconverging to a second route in the second RIB based on the first route being down in the second RIB, wherein the production data traffic is being forwarded on the first route using the first RIB;
    sending, from the network device, second RIB updates to neighboring devices that indicate that the first route is down in the second RIB;
    forwarding test traffic towards the destination node on the second route based on the updated second RIB; and
    determining whether the test traffic reached the destination node.

2. The method of claim 1, further comprising storing data indicating that the first route is a preferred data route in a forwarding information base (FIB).

3. The method of claim 2, wherein the second RIB does not install entries into the FIB.

4. The method of claim 1, further comprising flagging the test traffic to cause the test traffic to be sent to the second route.

5. The method of claim 1, further comprising determining that the test traffic reconverged at the destination node.

6. The method of claim 1, wherein the test traffic is an encapsulated test frame including a wrapper that is encoded to indicate routing by the second RIB.

7. The method of claim 1 wherein the first route is a most efficient data route of a plurality of possible data routes and the second route is a next most efficient data route of the plurality of possible data routes as determined by the second RIB.

8. A device for routing data in a computer network, the device comprising:
    one or more processors; and
    one or more non-transitory computer-readable media storing instructions that, when executed by the one or more processors, cause the device to perform operations comprising:
        storing a first routing information base (RIB);

storing a second RIB that is at least partially a replica of the first RIB;

receiving production data traffic;

forwarding the production data traffic on a first route toward a destination node based on the first RIB;

introducing a resiliency test in the second RIB of the device that results in the first route going down in the second RIB;

updating the second RIB to result in an updated second RIB by reconverging to a second route in the second RIB based on the first route being down in the second RIB, wherein the production data traffic is being forwarded on the first route using the first RIB;

sending, from the device, second RIB updates to neighboring devices that indicate that the first route is down in the second RIB;

forwarding test traffic towards the destination node on the second route based on the updated second RIB; and testing for successful delivery of the test traffic via the second route.

9. The device of claim 8, the operations further comprising storing data indicating that the first route is a preferred data route in a forwarding information base (FIB).

10. The device of claim 9, wherein the second RIB does not install entries into the FIB.

11. The device of claim 8, the operations further comprising flagging the test traffic to cause the test traffic to be sent to the second route.

12. The device of claim 8, the operations further comprising determining that the test traffic reconverged at the destination node.

13. The device of claim 8, wherein the test traffic is an encapsulated test frame including a wrapper that is encoded to indicate routing by the second RIB.

14. The device of claim 9, wherein the first RIB and second RIB reside in software and the FIB resides in hardware.

15. A system comprising:

one or more processors; and one or more non-transitory computer-readable media storing instructions that, when executed by the one or more processors, cause the system to perform operations comprising:

storing, at a network device, a first routing information base (RIB);

storing, at the network device, a second RIB that is at least partially a replica of the first RIB;

receiving production data traffic;

forwarding the production data traffic on a first route to a destination node based on the first RIB;

introducing a resiliency test in the second RIB of the network device that results in the first route going down in the second RIB;

updating the second RIB to result in an updated second RIB by reconverging to a second route in the second RIB based on the first route being down in the second RIB, wherein the production data traffic is being forwarded on the first route using the first RIB;

sending, from the network device, second RIB updates to neighboring devices that indicate that the first route is down in the second RIB;

forwarding test traffic towards the destination node on the second route based on the updated second RIB; and determining whether the test traffic reached the destination node.

16. The system of claim 15, the operations further comprising storing data indicating that the first route is a preferred data route in a forwarding information base (FIB).

17. The system of claim 16, wherein the second RIB does not install entries into the FIB.

* * * * *